C. E. ROBINSON.
OILING DEVICE.
APPLICATION FILED OCT. 6, 1917.
1,268,281.
Patented June 4, 1918.
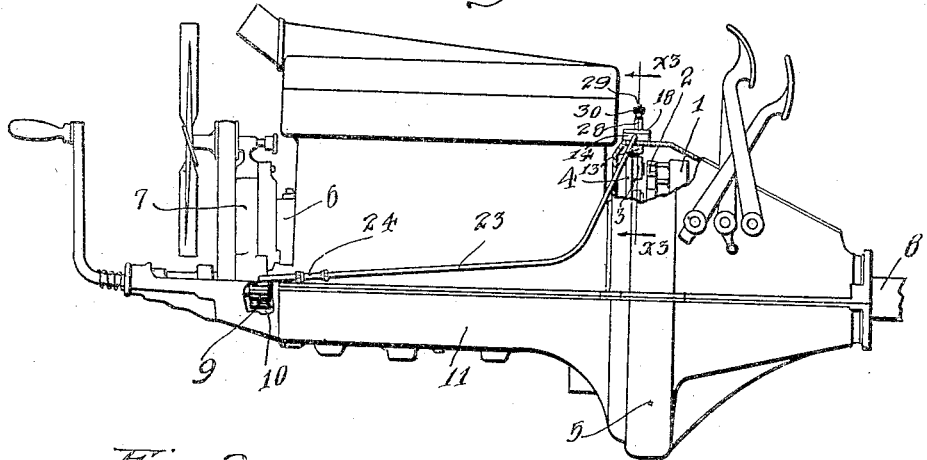
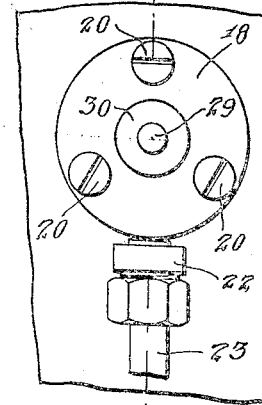
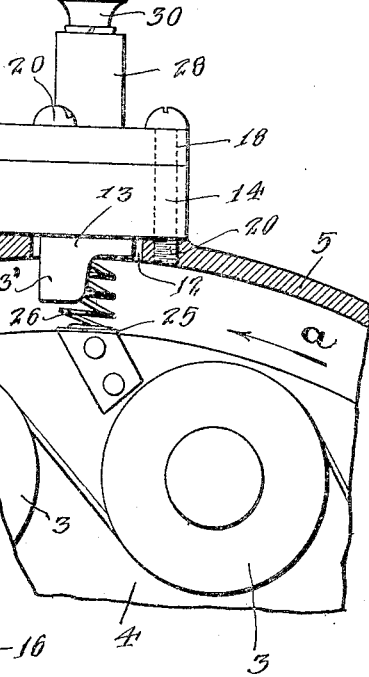
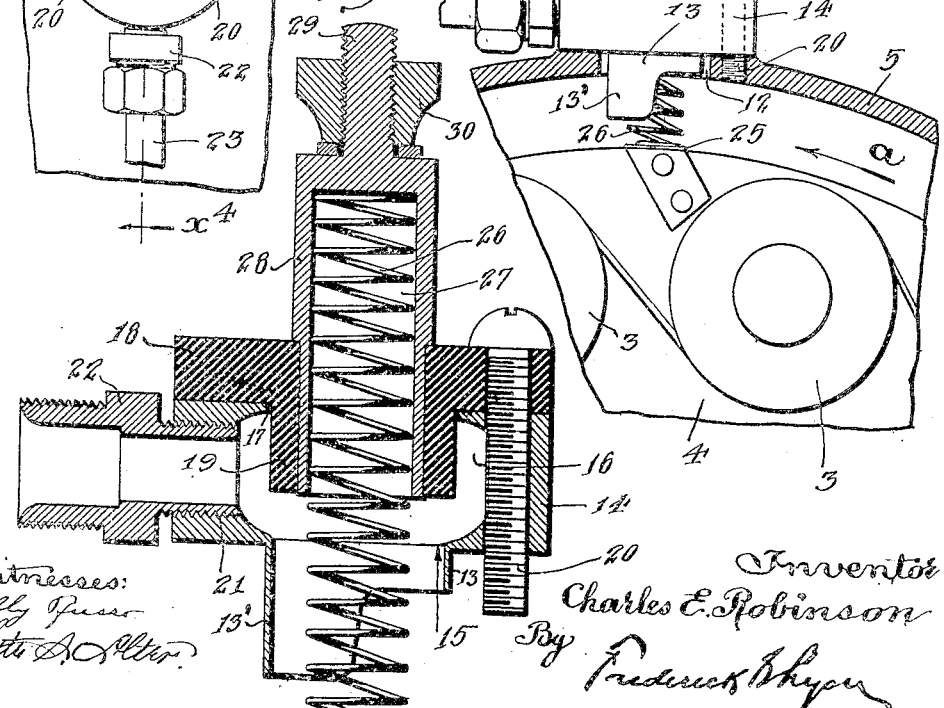
Inventor
Charles E. Robinson

UNITED STATES PATENT OFFICE.

CHARLES E. ROBINSON, OF ORANGE, CALIFORNIA.

OILING DEVICE.

1,268,281.  Specification of Letters Patent.  Patented June 4, 1918.

Application filed October 6, 1917. Serial No. 195,183.

*To all whom it may concern:*

Be it known that I, CHARLES E. ROBINSON, a citizen of the United States, residing at Orange, in the county of Orange and State of California, have invented a new and useful Oiling Device, of which the following is a specification.

This invention relates to devices of the character designed for oiling engine bearings, and is especially useful in the oiling of the front bearings of automobile internal combustion engines. The invention is shown as applied to a Ford engine, but it is understood that it may be possible to use it with other engines.

An object of the invention is to cause oil to flow through the oil pipe with considerable force, utilizing for this purpose the centrifugal effect produced on the oil by some of the rotating parts of the engine.

Another object is to insure effective oiling by a comparatively simple construction.

Other objects and advantages will appear in the subjoined detail description.

The accompanying drawings illustrate the invention:

Figure 1 is a side elevation of the invention and of the engine on which the invention is mounted.

Fig. 2 is an enlarged plan view of the oiling device shown in Fig. 1, a portion of the oil pipe being broken away to contract the view and a fragment of the flywheel housing also being shown.

Fig. 3 is an enlarged fragmental elevation, the flywheel housing being shown in section on line indicated by line $x^3$—$x^3$, Fig. 1.

Fig. 4 is an enlarged vertical mid-section of the invention omitting the oil pipe.

The engine shown in Fig. 1 of the drawings is a typical Ford engine and the invention will be described as applied thereto in order that the operation of the invention will be clearly understood. The engine is provided with the usual flywheel 1 carrying magnets 2 which electrically coöperate with magnets 3 mounted on a magnet support 4 to furnish electric current in a manner well understood in connection with the operation of Ford engines. Thus the flywheel 1 and magnets 2 constitute a rotary part of the engine adapted to throw oil by centrifugal force outward against the periphery of the housing 5. The front bearing of the engine is indicated at 6 and forward of said bearing is a gear case 7 inclosing the gearing which connects the engine shaft 8 with the valve gear shaft, not shown, one of the gears being indicated at 9 in Fig. 1.

Ordinarily by the old construction of Ford engines oil flows by gravity from the housing 5 through a tube inside of said housing into the gear chamber 10, but the oil tube frequently becomes clogged, and when this occurs and is unnoticed by the operator the bearing 6 burns out and if the unoiled condition prevails for a sufficient length of time the crank bearings themselves, or at least some of them, burn out. Even when the non-flow of oil is discovered considerable time and labor are required to correct the evil, since it is necessary to remove the crank case indicated at 11.

The housing 5 is provided with an opening 12 and inserted in said opening and projecting downward therefrom is an oil catching member 13 tubular at its upper end and having its lower portion notched at one side so that the portion opposite the notch is in the form of a curved lip 13'. The lip 13' projects downward from and, if desired, may be formed integral with, a hollow body 14 having a port 15 in its lower side through which oil can flow from the interior of the oil catcher 13 to the chamber 16 of the hollow body 14. The oil catcher 13 projects from the housing into close proximity to the periphery of the magnets 2. The hollow body 14 is provided in its upper side opposite the port 15 with an opening 17 closed by a suitable cover 18 which in the instance shown is provided with a boss 19 projecting into the chamber 16. The cover 18 and body 14 are fastened to the housing 5 by screws 20 which pass through the cover and body and into said housing.

The body 14 is provided with an opening 21 into which is screw-threaded one end of a nipple 22, the outer end of said nipple being screw-threaded into one end of an oil tube 23 connected to the gear case 7 and projecting through the wall thereof so as to discharge onto the gear 9 in the chamber 10. Though not essential to the working of the device, the oil tube 23 may be provided with a window or sight glass 24.

The above described device functions as follows: During operation of the engine, the flywheel rotates in the direction of the arrow *a* Fig. 3 and throws oil by centrifugal action into the oil catching member 13. The centrifugal pressure is considerable and is sufficient to force the oil through the port 15 into the chamber 16 and thence through the nipple 22 into the oil tube 23 from whence it discharges onto the gear 9 in the chamber 10. The oil is carried upward, as is well understood, by the gearing in the gear case 7 and spreads to the bearing 6 from whence some of it passes to the bearings of the cranks. By thus utilizing the centrifugal force resulting from rotation of the flywheel 1, it is clear that stoppage of the tube with oil is insured against so that burning out of the bearings will not occur.

The invention has been described above as though it were applied to the engine without taking into consideration certain other features not yet described which already exist on Ford cars, and it is understood that the invention may be thus used, but it is also understood that said other features may be used in coöperation with those above described and such construction will now be set forth. In the usual Ford cars the magnet support 4 is provided with a magneto contact point 25, as in Fig. 3, and said contact point is engaged by a spring substantially corresponding to that shown at 26, though the spring 26 is somewhat longer than the spring provided in the original construction of the engine. It is understood that the bushing 18 is made of suitable electrical insulating material. The upper end of the spring 26 is accommodated in a spring chamber 27 formed by the bore of a cylindrical magneto contact member 28 inserted in the bushing 18, there being a binding post 29 projecting from the upper end of the contact member 28. Screw-threaded onto the binding post 29 is a binding nut 30 for the purpose of securely fastening an electrical conductor to the contact device. This construction together with the cover or bushing 18 is commonly used on Ford cars, the only difference being that the bushing 18, instead of being mounted directly on the housing 5 with the portion 19 projecting through the opening 12 in said housing, in this instance is mounted on the body 14 and the portion 19 projects through the opening 17. Thus it is clear that where the invention is to be applied to a Ford car all that is necessary is to remove the screws holding the bushing 18 in place; to then remove the contact member 28 and bushing 18; to next place the body 14 in place as above described and fasten the bushing 18 in place with the screws 20, the screws 20 being somewhat longer than the original screws used for fastening the bushing on the housing; to then tap a hole in the gear case 7; and to then screw-thread the pipe 23 into said hole and connect it by the nipple 22 to the body 14. The parts thus assembled into place perform a double function, to wit: the carrying of oil from the housing 5 to the gear case 7 and the conducting of electric current to or from the electric contact 25.

From the foregoing it is clear that the device is not only simple to make but very easily and quickly assembled in place on the engine.

I claim:

1. In combination, an engine having a housing and having rotary magnets in the housing and having a magnet support provided with magnets, there being an electric contact on the support, a hollow body mounted on the housing and provided with a port, an oil catching member projecting from the port into the housing, a chambered contact member electrically insulated from the hollow body, a spring having one end accommodated in the contact member and having its other end resting on the electric contact of the support, and a pipe connected at one end with the hollow body and having its other end discharging adjacent one of the engine bearings.

2. In an oiling device, a hollow body provided with a port, an electrical contact member on the hollow body and electrically insulated therefrom, an oil catching member projecting from the port, and a spring engaging the electrical contact member and projecting beyond the outer end of the oil catching member.

Signed at Orange, California, this 29th day of September 1917.

CHARLES E. ROBINSON.

Witnesses:
Mrs. Peter Laan,
Ruth Leech.

Copies of this patent may be obtained for five cents each, by addressing the "Commissioner of Patents, Washington, D. C."